United States Patent [19]

Lee, Jr.

[11] Patent Number: 5,324,782

[45] Date of Patent: * Jun. 28, 1994

[54] IMPACT MODIFIED POLYPHENYLENE ETHER-POLYAMIDE COMPOSITIONS

[75] Inventor: Gim F. Lee, Jr., Albany, N.Y.

[73] Assignee: General Electric Company, Pittsfield, Mass.

[*] Notice: The portion of the term of this patent subsequent to Oct. 17, 2006 has been disclaimed.

[21] Appl. No.: 966,672

[22] Filed: Oct. 26, 1992

Related U.S. Application Data

[60] Continuation of Ser. No. 614,820, Nov. 16, 1990, abandoned, which is a division of Ser. No. 228,249, Aug. 4, 1988, abandoned, which is a continuation of Ser. No. 837,474, Mar. 7, 1986, abandoned.

[51] Int. Cl.$^5$ .................. C08L 25/08; C08L 71/12; C08L 77/06
[52] U.S. Cl. ..................... 525/92; 525/397; 525/905
[58] Field of Search ............ 525/92, 397, 905

[56] References Cited

U.S. PATENT DOCUMENTS

| | | | |
|---|---|---|---|
| 3,379,792 | 4/1968 | Finholt | 525/397 |
| 4,315,086 | 2/1982 | Ueno et al. | 525/391 |
| 4,339,376 | 7/1982 | Kasahara et al. | 525/92 |
| 4,383,082 | 5/1983 | Lee, Jr. | 525/92 |
| 4,421,892 | 12/1983 | Kasahara et al. | 524/514 |
| 4,427,828 | 1/1984 | Hergenrother et al. | 525/92 |
| 4,588,765 | 5/1986 | Beever | 525/92 |
| 4,600,741 | 7/1986 | Aycock et al. | 524/139 |
| 4,874,810 | 10/1989 | Lee, Jr. et al. | 524/505 |

FOREIGN PATENT DOCUMENTS 213364 12/1981 Japan.
117250 7/1983 Japan.

Primary Examiner—James J. Seidleck
Assistant Examiner—Thomas Hamilton, III

[57] ABSTRACT

Thermoplastic compositions comprised of compatible combinations of a polyphenylene ether resin and a polyamide resin and which require improved low temperature ductility can be impact modified with a modifying agent comprising a partially hydrogenated diblock copolymer of styrene and ethylene/propylene.

9 Claims, No Drawings

IMPACT MODIFIED POLYPHENYLENE ETHER-POLYAMIDE COMPOSITIONS

This is a continuation of copending application Ser. No. 07/614,820 filed on Nov. 16, 1990, now abandoned which is a divisional, of application Ser. No. 07/228,249, filed on Aug. 4, 1988, now abandoned which is a continuation of Ser. No. 837,474 filed on Mar. 7, 1986.

FIELD OF THE INVENTION

Compositions comprising a combination of polyphenylene ether resin and polyamide resin can be impact modified with a selectively hydrogenated diblock copolymer of styrene and ethylene/propylene which is particularly effective for thermoplastic applications requiring improved low temperature ductility.

BACKGROUND OF THE INVENTION

Polyphenylene ether resins have been modified with polyamide resins to provide a wide variety of beneficial properties such as excellent heat resistance, chemical resistance, impact strength, hydrolytic stability and dimensional stability. The improved properties of polyphenylene ether-polyamide compositions have found great utility in thermoplastic applications which take advantage of such properties. Exterior automotive applications such as body panels and wheel covers all benefit from the improved thermal properties of polyphenylene ether-polyamide compositions (PPE/PA compositions). In typical automotive applications such as a fender part, a satisfactory thermoplastic must be capable of providing satisfactory properties over a wide range of end-use temperatures.

Although many important thermoplastic applications for PPE/PA compositions require that the resin be impact modified to provide adequate performance, the ductile behavior of such reasons is often overlooked.

Ductile behavior is an important physical property for thermoplastics in many applications, but particularly for automotive parts which may experience extremely rigorous conditions at very low temperatures. The mode of failure for a part, whether ductile or brittle failure, at a given temperature is also an important indication of the utility of the thermoplastic. Improvements in low temperature ductile-brittle transitions will increase the opportunity for polyphenylene ether-polyamide compositions to adequately service thermoplastic applications where such properties are required or desired. Many conventional, rubber-like impact modifiers offer advantages and disadvantages but do not provide the range of ductile behavior improvement offered by the present invention. Conventional impact modifiers for polyphenylene ether-polyamide compositions can be costly and ineffective compared to the impact modification system described herein.

It has now been discovered that polyphenylene ether-polyamide compositions can be improved by combining the base resin with a modifier comprised of a partially hydrogenated diblock copolymer of styrene and ethylene-propylene in accordance with the description below. Such compositions exhibit the superior properties normally associated with compatible polyphenylene ether/polyamide compositions as well as unexpectedly improved ductile behavior.

SUMMARY OF THE INVENTION

Thermoplastic compositions of the present invention are comprised of:

a. a base resin which is a compatiblized combination of a polyphenylene ether resin and a polyamide resin; and b. an amount of an impact modifying agent effective for improving the ductile behavior of such base resin and which is a selectively hydrogenated diblock copolymer of styrene and ethylene/propylene.

Preferred polyphenylene ether resins and polyamide resins as well as means for providing compatiblized combinations thereof are described below.

In general it is desirable that the polyamide component comprise a continuous phase in the overall composition and, therefore, typically at least 35 percent by weight of the total PPE-polyamide-modifier composition will be comprised of the polyamide component. The remainder of the composition will be comprised of the PPE and diblock copolymer modifier, in typical weight ratios described below.

The preferred diblock modifying component is typically comprised of 20 to 40 weight percent of a styrene block and 80 to 60 weight percent of an ethylene/propylene block which can be derived from a rubbery block which has been selectively hydrogenated to eliminate some or all of the residual unsaturation contained in the rubbery block.

DESCRIPTION OF THE INVENTION

Polyphenylene ethers are a well known class of compounds sometimes referred to as polyphenylene oxides. Examples of suitable polyphenylene ethers and processes for preparation can be found in U.S. Pat. Nos. 3,306,874; 3,306,875; 3,257,357; and 3,257,358 which are each incorporated by reference. Compositions of the present invention will encompass homopolymers, copolymer and graft copolymers obtained by the oxidative coupling of phenolic compounds. The preferred polyphenylene ethers used as base resins in compositions of the present invention will be comprised of units derived from 2,6-dimethyl phenol. Also contemplated are PPE copolymers comprised of units derived from 2,6-dimethyl phenol and 2,3,6-trimethyl phenol.

A particularly useful polyphenylene ether would be poly(2,6-dimethyl-1,4-phenylene ether) having an intrinsic viscosity (I.V.) greater than, approximately 0.10 dl/g as measured in chloroform at 25° C. The I.V. will typically be between 0.30 and 0.50 dl/g.

The polyamide resins useful in the practice of the present invention are a generic family of resins known as nylons, characterized by the presence of an amide group (—CONH—). Nylon-6 and nylon-6,6 are the generally preferred polyamides and are available from a variety of commercial sources. Other polyamides, however, such as nylon-4, nylon-12, nylon-6,10, nylon-6,9 or others such as the amorphous nylons may be useful for particular polyphenylene ether-polyamide applications.

The polyamides can be provided by a number of well known processes. Nylon-6, for example, is a polymerization product of caprolactam. Nylon-6,6 is a condensation product of adipic acid and hexamethylenediamine. A nylon-6,6 having an average molecular weight of approximately 10,000 is especially preferred for many useful polyphenylene ether-polyamide thermoplastic applications. Preferred polyamides will typically have a relative viscosity of at least 35, in accordance with ASTM Test Method D789.

In U.S. Pat. No. 3,379,792, (incorporated herein by reference) Finholt provided useful combinations of polyphenylene ether and polyamide, where the weight percent of the polyamide component did not exceed about 25 percent. Beyond that proportion, noticeable decrease in properties was attributed to the relative incompatibility of the two resins.

In preferred embodiments of the present invention, a compatibilizing agent may be employed in the preparation of the composition. The two-fold purpose for using compatibilizing agents is to improve, in general, the physical properties of the polyphenylene ether-polyamide resin, as well as to enable the use of a greater proportion of the polyamide component. When used herein, the expression "compatibilizing agent" refers to those polyfunctional, compounds which interact with either the polyphenylene ether, the polyamide or both. This interaction may be chemical (e.g. grafting) or physical (e.g. affecting the surface characteristics of the dispersed phases). In either instance the resulting polyphenylene ether-polyamide composition appears to exhibit improved compatibility, particularly as evidence by enhanced impact strength, mold knit line strength and/or elongation. As used herein, the expression "compatiblized polyphenylene ether-polyamide base resin" refers to those compositions which have been physically or chemically compatibilized with an agent as discussed above, as well as those compositions which are physically compatible without such agents, as taught in the Finholt patent mentioned earlier.

Examples of the various compatibilizing agents that may be employed in the practice of the present invention include: a) liquid diene polymers, b) epoxy compounds, c) oxidized polyolefin wax, d) quinones, e) organosilane compounds and f) polyfunctional compounds as described hereinafter.

Liquid diene polymers (a) suitable for use herein include homopolymers of a conjugated diene with at least one monomer selected from the group consisting of other conjugated dienes; vinyl monomer, e.g. styrene and alpha-methyl styrene; olefins, e.g. ethylene, propylene, butene-1, isobutylene, hexene-1, octene-1 and dodecene-1, and mixtures thereof, having a number average molecular weight of from 150 to 10,000 preferably 150 to 5,000. These homopolymers and copolymers can be produced by the methods described in, for example, U.S. Pat. Nos. 4,054,612; 3,876,721 and 3,428,699 incorporated herein by reference and include, among others, polybutadiene, polyisoprene, poly(1,3-pentadiene), poly(butadiene-isoprene), poly(styrene-butadiene), polychloroprene, poly(butadiene-alpha methylstyrene), poly(butadiene-styrene-isoprene), poly(butylene-butadiene) and the like.

Epoxy compounds (b) suitable for use in the practice of the present invention include: (1) epoxy resins produced by condensing polyhydric phenols (e.g. bisphenol-A, tetrabromobisphenolOA, resorcinal and hydroquinone) and epichlorohydrin; (2) epoxy resins produced by condensing polyhydric alcohols (e.g. ethylene glycol, propylene glycol, butylene glycol, polyethylene glycol, polypropylene glycol, pentaerythritol and trimethylolethane and the like) and epichlorohydrin; (3) glycidyletherified products of monohydric alcohols and monohydric phenols including phenyl glycidylether, butyl glycidyl ether and cresyl glycidylether; (4) glycidyl derivatives of amino compounds for example, the diglycidyl derivative of aniline, and (5) epoxidized products of higher olefinic or cycloalkene, or natural unsaturated oils (e.g. soybean) as well as of the foregoing liquid diene polymers.

Oxidized polyolefin waxes (c) are well known and a description thereof and processes for the production of the same are found in U.S. Pat. Nos. 3,822,227 and 3,756,999 and German Patent Publications 3,047,915 and 2,201,862, herein incorporated by reference. Generally, these are prepared by an oxidation or suspension oxidation of polyolefin. An especially preferred polyolefin wax is "Hoescht Wacks".

Quinone compounds (d) suitable for use herein are characterized as having in the molecule of the unsubstituted derivative at least one 6 membered carbon ring; at least two carbonyl groups in the ring structure, both of which may be in the same or, if more than one ring, different rings, provided that they occupy positions corresponding to the 1,2- or 1,4-orientation of the monocyclic quinone; and at least two carbon-carbon double bonds in the ring structure, said carbon-carbon double bonds and carbonyl carbon-oxygen double bonds being conjugated with respect to each other. Where more than one ring is present in the unsubstituted quinone, the rings may be fused, non-fused or both: non-fused rings may be bound by a direct carbon-carbon double bond or by a hydrocarbon radical having conjugated unsaturation such as =C-C=.

Substituted quinones are also within the scope of the present invention. The degree of substitution; where substitution is desired, may be from one to the maximum number of replaceable hydrogen atoms. Exemplary of the various substituents that may be present on the unsubstituted quinone structures include halogen, e.g. chlorine, bromine, flourine, etc., hydrocarbon radicals including branched and unbranched, saturated and unsaturated alkyl, aryl, alkyl aryl and cycloalkyl radicals and halogenated derivatives thereof; and similar hydrocarbons having hetero atoms therein, particularly oxygen, sulfur or phosphorous and wherein the same connects the radical to the quionone ring (e.g. oxygen link).

Exemplary of the various quinones there may be given 1,2- and 1,4-benzoquione; 2,6-diphenyl quionone; tetramethyldiquinone; 2,2'- and 4,4'-diphenoquinone; 1,2-, 1,4- and 2,6-naphthoquinone; chloranils; 2-chloro-1,4-benzoquinone; 2,6-dimethyl benzoquione and the like.

Organosilane compounds (e) suitable as compatibilizing agents are characterized as having in the molecule (a) at least one silicon atom bonded to a carbon through an oxygen link and (b) at least one carbon-carbon double bond or carbon-carbon triple bond and/or a functional group selected from the group consisting of an amine group or a mercapto group provided that the functional group is not directly bonded to the silicon atom.

In such compounds, the C—O—Si component is generally present as an alkoxyl or acetoxy group bonded directly to the silicon atom, wherein the alkoxy or acetoxy group generally has less than 15 carbon atoms and may also contain hetero atoms (e.g. oxygen). Additionally, there may also be more than one silicon atom in the compound, such multiple silicon atoms, if present, being linked through an oxygen link (e.g. siloxanes), a silicon-silicon bond; or a bifunctional organic radical (e.g. methylene or phenylene groups).

Examples of suitable organosilane compounds include: gamma amino propyltriethoxy silane, 2-(3- cyclohexenyl)ethyl trimethoxy silane; 1,3-divinyl tetraethoxy silane; vinyl tris-(2-methoxyethoxy)silane; 5-bicycloheptenyl)triethoxy silane and gamma mercapto propyl trimethoxy silane.

Finally, polyfunctional compounds (f) which may be employed as compatibilizer in the practice of the present invention are of three types. The first type of polyfunctional compounds are those having in the molecule both (a) a carbon-carbon double bond or a carbon-carbon triple bond and (b) at least one carboxylic acid, acid anhydride, acid halide, anhydride, acid halide anhydride, acid amide, acid ester, imide, amino, or hydroxy group. Examples of such polyfunctional compound include maleic acid; maleic anhydride; fumaric acid; citraconic acid; itaconic acid; maleimide; maleic hydrazide; reaction products resulting from a diamine and maleic anhydride, maleic acid, fumaric acid, etc; dicholoro maleic anhydride; malic acid amide; unsaturated dicarboxylic acids (e.g. acrylic acid, butenoic acid, methacrylic acid, t-ethylacrylic acid, pentenoic acid); decenoic acids, undecenoic acids, pentenoic acid); linoleic acid, etc.); esters, acid amides or anhydrides or the foregoing unsaturated carboxylic acids; unsaturated alcohols (e.g. allyl alcohol, crotyl alcohol, methyl vinyl carbinol, 4-pentene-1-ol, 1,4-hexadiene-3-ol, 3-butene-1,4-diol, 2,5-dimethyl-3-hexene-2,5-diol and alcohols of the formulae $C_nH_{2n-5}OH$, $C_nH_{2n-7}OH$ and $C_nH_{2n-9}OH$, wherein n is a positive integer up to 30), unsaturated amines resulting form replacing the —OH group(s) of the above unsaturated alcohols with —NH$_2$ groups; and functionalized diene polymers and copolymers. Of these, one of the preferred compatibilizing agents for compositions of the present invention is maleic anhydride.

The second group of polyfunctional compatibilizer compounds suitable for use herein are characterized as having both (a) a group represented by the formula (OR) wherein R is hydrogen or an alkyl, aryl, acyl or carbonyl dioxy group and (b) at least two groups each of which may be the same or different selected from carboxylic acid, acid halide, acid anhydride, anhydride, acid halide anhydride, acid ester, acid amide, imido, amino and salts thereof. Typical of this group of compatibilizers are the aliphatic polycarboxylic acids, acid esters and acid amides represented by the formula:

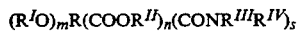

$$(R^IO)_mR(COOR^{II})_n(CONR^{III}R^{IV})_s$$

wherein R is a linear or branched chain, saturated aliphatic hydrocarbon of form 2 to 20, preferably 2 to 10, carbon atoms; $R^I$ is selected from the group consisting of hydrogen or an allyl, aryl, acyl or carbonyl dioxy group of 1 to 10, preferably 1 to 6, most preferably 1 to 4, carbon atoms, especially preferred is hydrogen; each $R^{II}$ is independently selected from the group consisting of hydrogen or an alkyl or aryl group of from 1 to 20 carbon atoms, preferably from 1 to 10 carbon atoms; each $R^{III}$ and $R^{IV}$ is independently selected from the group consisting essentially of hydrogen or an alkyl or aryl group of from 1 to 10, preferably from 1 to 6, most preferably 1 to 4, carbon atoms; m is equal to 1 and (n+s) is greater than or equal to 2, preferably equal to 2 or 3, and n and s are each greater than or equal to zero and wherein ($OR^I$) is alpha or beta to a carbonyl group and at least two carbonyl groups are separated by 2 to 6 carbon atoms. Obviously, $R^I$, $R^{II}$, $R^{III}$ and $R^{IV}$ cannot be aryl when the respective substituent has less than 6 carbon atoms.

Illustrative of suitable polycarboxylic acids there may be given citric acid, malic acid, and agaricic acid; including the various commercial forms thereof such as, for example, the anhydrous and hydrated acids. Of these, citric acid is another of the preferred compatibilizing agents. Illustrative of acid esters useful herein include for example, acetyl citrate and mono- and/or distearyl citrates and the like. Suitable acid amides useful herein include for example N,N'- diethyl citric acid amide; N,N'-dipropyl citric acid amid; N-phenyl citric acid amide; N-dodecyl citric acid amide; N,N'-didodecyl citric acid amide and N-dodecyl malic acid amide. Derivatives of the foregoing polycarboxylic acids are also suitable for use in the practice of the present invention. Especially preferred derivatives are the salts thereof, including the salts with amines and/preferably, the alkali and alkaline metal salts. Exemplary of suitable salts include calcium malate, calcium citrate, potassium malate and potassium citrate.

The third group of polyfunctional compatibilizer compounds suitable for use herein are characterized as having in the molecule both (a) an acid halide group, most preferably an acid chloride group and (b) at least one carboxylic acid, carboxylic acid anhydride, acid ester or acid amide group, preferably a carboxylic acid or carboxylic acid anhydride group. Exemplary of compatibilizers within this group there may be give trimellitic anhydride acid chloride, chloroformyl succinic anhydride, chloro formyl succinic acid, chloroformyl glutaric anhydride, chloroformyl glutaric acid, chloroacetayl succinic anhydride, chloroacetylsuccinic acid, trimellitic acid chloride and chloroacetyl glutaric acid. Among these, trimellitic anhydride acid chloride is preferred. Furthermore, it is especially preferred that compatibilizers of this group be prereacted with at least a portion of the polyphenylene ether whereby the compatibilizing agent is a PPE-functionalized compound.

Each of the foregoing compatibilizing agents are more fully described in U.S. Pat. No. 4,315,086; U.S. patent applications Ser. Nos. 669,130; 736,489 and 780,151 filed Nov. 7, 1984, May 20, 1985, and, Sep. 26, 1984, respectively, and European Patent Application No. 04640, altogether herein incorporated by reference.

The foregoing compatibilizing agents may be used alone or in any combination of one another. Furthermore, they may be added directly to the melt blend or precompounded with either or both the polyphenylene oxide and polyamide as well as with other resinous materials employed in the preparation of the compositions of the present invention. With many of the foregoing compatibilizing agents, particularly the polyfunctional compounds, even greater improvement in compatibility is found where at lest a portion of the compatibilizing agent is precompounded with all or part of the polyphenylene oxide. It is believed that such precompounding may cause the compatibilizing agent to react with the polymer and, consequently, functionalize that polymer. For example, the polyphenylene oxide may be precompounded with trimellitic acid chloride anhydride to form an anhydride functionalized polyphenylene ether which has improved compatibility with the polyamide compared to a non-functionalized polyphenylene ether.

Where the compatibilizing agent is employed in the preparation of the compositions of the present invention, the initial amount used will be dependent upon the specific compatibilizing agent chosen and the specific polymeric system to which it is added. The examples below depict several suitable compatibilization methods used in the practice of the present invention.

Those skilled in the art will be able to provide impact improved compositions comprising various proportions of the polyphenylene ether resin, the polyamide resin the compatibilizing agent, if required, and the diblock copolymer impact modifier. In general, however, where chemical resistance is a desirable property of the thermoplastic resin, it will ordinarily be necessary that the polyamide resin form a continuous phase of the resin composition. Therefore, to avoid a phase inversion whereby the polyamide phase is discontinuous, the preferred compositions of the present invention will be comprised of a polyamide resin in an amount equal to or greater than approximately 35 percent by weight of the total composition (i.e. The PPE, PA, and diblock copolymer components taken together). The remaining components will be comprised of the PPE and diblock copolymer impact modifier, and may together account for up to approximately 65 percent by weight of the total resinous components of the composition.

A variety of useful polyphenylene ether-polyamide compositions can be provided which include varying amounts of the diblock copolymer modifying agent. Typically, improved properties, especially regarding the ductile behavior of the plastic, will be noted when 1 to 30 parts by weight of the diblock copolymer are utilized per 100 parts of the polyphenylene ether and polyamide components taken together.

As might be expected, lower amounts of the diblock copolymer modifier would achieve little useful effect, whereas excess amounts could detract from the physical properties of the thermoplastic resin composition. In preferred compositions, approximately 5 to 25 parts of the diblock copolymer modifier will be utilized per 100 parts by weight of the base resin.

The diblock copolymer rubber additive useful in compositions of the present invention is a thermoplastic rubber comprised of an alkenyl aromatic block which is typically a styrene block and an ethylene-propylene block which had been derived from a partially or selectively hydrogenated block. These materials are commonly referred to as SEP diblocks. The weight ratio of the styrene block compared to the rubber block may be varied to a considerable degree and many useful compositions can be provided without difficulty. Typically, commercially available diblock copolymers having a styrene:rubber ratio of 20 to 40 parts styrene: 80 to 60 parts rubber will be preferred. These materials may be made by the anionic polymerization of the respective block components, followed by selective hydrogenation. Selective hydrogenation refers to the hydrogenation of some or all of the unsaturated sites on the rubber component as opposed to hydrogenation of the aromatic styrene component. This selective hydrogenation process is one feature which distinguishes DEP diblock from conventional SBR rubber compounds. The SEP diblock copolymers having selectively hydrogenated rubber blocks exhibit improved properties in compositions of the present invention, especially as compared to conventional non-hydrogenated diblock copolymers, as well as hydrogenated and non-hydrogenated triblock and multiblock copolymers.

Useful selectively hydrogenated diblock copolymers of the styrene-ethylene/propylene type are commercially available in a variety f grades from Shell Chemical Co., Commercial grades typically contain minor amounts of antioxidants and stabilizers. For purposes of the present disclosure it is intended that the selectively hydrogenated diblock copolymer of the styrene-ethylene/propylene type encompasses those similar diblock copolymers which may be provided from a variety of starting materials, in particular, selectively hydrogenated diblock copolymers of styrene and isoprene.

The preparation of selectively hydrogenated block copolymers of alkenyl aromatic polymers and diene polymers is described in numerous patents, including U.S. Pat. No. 4,085,163 and 4,041,103 (both incorporated by reference) which also describe the use of such copolymers in polyamide resins. Their use in compatible polyphenylene ether-polyamide resin systems was not forseen nor was the improvement in such systems of the ductile behavior noted in the present invention.

The foregoing constituent ingredients can be compounded and molded by conventional means. The order of mixing and degree of shear experienced during extrusion can be varied. It would be expected that the physical properties could vary as such processing conditions are varied. Those skilled in the art will be able to achieve optimum processing conditions which may vary for different thermoplastic applications.

Thus in one instance, each of the ingredients could be blended and extruded at once, thereby providing thermoplastic resin having a particular property profile. Alternatively it may be desirable to pre-blend or pre-compound some of the ingredients while the remaining ingredients are charged later in a compounding or extrusion process.

In one embodiment, the polyphenylene ether, with or without a compatibilizing agent, could be pre-compounded with the diblock copolymer impact modifier. Thereafter, the polyamide resin could be charged to the extruder downstream, at a point sufficient to provide adequate mixing but with minimum risk of degradation due to excess heat.

Additionally, it is expected that conventional additives such as fillers pigments and flame retarding compounds and metal synergists can be incorporated in the thermoplastic compositions of the present invention, thereby providing a variety of useful products.

Unless otherwise noted, all formulations in the following examples are given in parts by weight. These examples should not be considered s limiting the scope of the invention in any way.

EXAMPLES 1 AND 2

Several thermoplastic blends in accordance with the present invention were prepared and compared to composition shaving conventional impact modifiers as described in Table 1. The polyphenylene either was poly(2,6-dimethyl-1,4-phenylene ether) having an intrinsic viscosity of 0.45 as measured in chloroform at 25° C. The polyamide component was nylon 6, designated NYCOA 471 from Nylon Company of America. Except for two control blends, each blend in this series contained 50 parts by weight polyphenylene ether, 40 parts nylon 6, 0.5 parts of maleic anhydride compatibilizing agent, and 10 parts of the designated rubber additive.

The compositions were compounded by blending the requisite constituents which were extruded on a Werner & Pfleiderer 28 mm twin screw extruder having set temperatures over several stages of 450°/530°/535°/540°/550°/560° F., no vacuum, at 280 rpm.

The compositions were molded on a Newbury three ounce injection molding machine having a barrel set temperature of 550°-580° F., a mold set temperature of 150°160° F., and a total cycle time of 40 seconds. The mode of failure in the Cynatup (DYN) falling dart impact test is characterized as B (brittle), B-D (brittle-ductile), or D (ductile) based on disk response to impact. Dynatup results are reported in inch-pounds at maximum load (ML) and total energy (TE), at room temperature as well as −40° F.

oxide resin, 51 parts nylon 6,6, 10 parts of the rubber components, 0.50 parts maleic anhydride compatibilizing agent, 0.10 parts KI and 0.30 parts Irganox 1076 stabilizers. The blends were mixed in a Henshel mixer, extruded in a single pass on a 28 mm Werner & Pfleiderer extrude and molded on a 3 ounce Newbury molding machine. The extruder had a 550° F. set temperature for most of the barrel, the molder was set at 550° F. melt and 150° F. mold. The physical properties were measured on standard ASTM parts. Results are given in

TABLE 1

| SAMPLE | RUBBER | MALEIC ANHYDRIDE | TEN. YLD. Kpsi | TUS Kpsi | TE % | IZOD ft. lbs./in. | HDT 66 psi | DYN ML | DYN TE | FAILURE MODE | DYN ML-40F | DYN TE-40F | FAILURE MODE-40F | FLOW CHANNEL (") |
|---|---|---|---|---|---|---|---|---|---|---|---|---|---|---|
| A* | none | none | 6.8 | 6.8 | 5 | 0.8 | 367 | 7 | 12 | B | B | 11 | B | 23.5 |
| B* | none | 0.5 | 10.9 | 8.1 | 43 | 1.0 | 375 | 42 | 43 | B | 36 | 36 | B | 26.75 |
| C* | SEBS triblock(a) | 0.5 | 8.1 | 6.9 | 41 | 2.1 | 370 | 360 | 516 | B-D | 24 | 24 | B | 25.75 |
| D* | SEBS triblock(b) | 0.5 | 6.6 | 6.6 | 38 | 3.2 | 363 | 312 | 524 | B | 32 | 34 | B | 26.25 |
| E* | SEBS triblock(c) | 0.5 | 5.6 | 5.5 | 33 | 2.0 | 353 | 72 | 72 | B | 12 | 12 | B | 29 |
| 1 | SEP diblock(d) | 0.5 | 8.8 | 7.1 | 36 | 9.6 | 366 | 378 | 558 | D | 468 | 576 | B | 26.5 |
| 2 | SEP diblock(e) | 0.5 | 8.2 | 6.9 | 52 | 12.1 | 369 | 384 | 576 | D | 444 | 564 | B | 25.75 |
| F* | SBS triblock(f) | 0.5 | 8.2 | 7.2 | 72 | 7.1 | 365 | 408 | 583 | D | 492 | 564 | B | 25.25 |
| G* | SBS triblock(g) | 0.5 | 7.9 | 7.1 | 54 | 6.4 | 362 | 396 | 576 | D | 516 | 598 | B | 25 |
| H* | SBS rubber(h) | 0.5 | 9.0 | 7.4 | 52 | 4.5 | 351 | 348 | 538 | D | 384 | 444 | B | 26.75 |

*Samples A-H are comparative examples
(a)Kraton G 1651, Shell Chemical selectively hydrogenated styrene-ethylene/butylene-styrene triblock copolymer
(b)Kraton G 1652, Shell Chemical selectively hydrogenated styrene-ethylene/butylene-styrene triblock copolymer
(c)Kraton G 1657, Shell Chemical selectively hydrogenated styrene-ethylene/butylene-styrene triblock copolymer
(d)Kraton GX 1701, Shell Chemical selectively hydrogenated styrene-ethylene/propylene diblock copolymer styrene:rubber ratio is approximately 37:63
(e)Kraton GX 1702, Shell Chemical selectively hydrogenated styrene-ethylene/propylene diblock copolymer styrene:rubber ratio is approximately 27:73
(f)Kraton D 1101, Shell Chemical, styrene-butadiene-styrene triblock copolymer
(g)Kraton D 1102, Shell Chemical, styrene-butadiene-styrene triblock copolymer
(h)Stereon 840A, Firestone Chemical styrene-butadiene multiblock copolymer It will be evident form the foregoing that several physical properties of compatible polyphenylene ether-polyamide compositions can be improved upon the addition of the S-E/P diblock copolymer modifier utilized by the present invention.

EXAMPLES 3 AND 4

In the following examples the polyphenylene oxide was melt extruded with a different polyamide, nylon-6,6 (Nylon Polymers NP 10,000). Distribution of the rubber in the resin matrix is an important requirement for good impact properties in polyphenylene ether-polyamide resins. In general it has been found that predispersing the rubber component in the polyphenylene oxide offers better typical properties. This may be accomplished by adding all of the rubber, compatibilizing agent, and the polyphenylene oxide to the throat of the extruder and splitting the nylon between the feedthroat and a downstream addition port. This downstream feeding is effective but requires extra equipment. It is often desirable to eliminate processing steps, where possible, form a manufacturing process.

In this series of experiments it can be seen that the SEP diblock rubbers give improved properties relative to conventional triblock rubbers without requiring downstream feeding of some of the nylon. The following blends were prepared using 49 parts polyphenylene Table 2.

TABLE 2

| Example | Rubber Type | Notch Izod | Tensile Elongation | Dynatup Impact | Mode of Failure |
|---|---|---|---|---|---|
| 3 | Saturated SEP Diblock(a) | 10.0 | 42 | 528 | D |
| 4 | Saturated SEP Diblock(b) | 11.9 | 51 | 528 | D |
| I* | Unsaturated SBS Triblock(b) | 4.8 | 89 | 456 | D |
| J* | Saturated SEBS Diblock(c) | 6.6 | 62 | 600 | D |
| K* | Saturated SEBS Diblock(d) | 2.1 | 41 | 204 | B |

*Comparative Examples
(a)Kraton GX 1701
(b)Kraton D 1102
(c)Kraton G 1650
(d)Kraton G 1651

EXAMPLES 5-8

Blends were prepared as above using 24.5 parts polyphenylene ether, 24.5 parts PPE-TAAC compatibilizing agent, 41 parts nylon 6,6, and either 5 or 10 parts of the rubber component. The PPE-TAAC compatibilizing agent was the reaction product of a polyphenylene ether resin in solution and trimellitic anhydride acid chloride, which is thereafter isolated and dried. This PPE-TAAC compound is a functionalized polyphenylene either, capable of compatibilizing a polyphenylene ether-polyamide composition and which, in this example, replaced 24.5 parts of the conventional polyphenylene ether. Table 3 describes the results where it can be seen that acceptable properties can be achieved with reduced rubber content, resulting in higher heat distortion values and lower costs. All modes of failure were of the ductile type.

TABLE 3

| Example | Rubber Type (parts) | Notch Izod | Dynatup Impact | Tensile Elongation | HDT 66 psi |
|---|---|---|---|---|---|
| M* | Unsaturated S-B-S (10)[a] | 8.8 | 492 | 44 | 370 |
| 5 | Saturated SEP diblock (10)[b] | 10.4 | 552 | 67 | 387 |
| 6 | Saturated SEP diblock (5)[b] | 4.4 | 529 | 43 | 391 |
| 7 | Saturated SEP diblock (10)[c] | 9.8 | 551 | 53 | 381 |
| 8 | Saturated SEP diblock (5)[c] | 3.4 | 491 | 37 | 392 |

*Comparison
[a]Kraton D 1102 Triblock
[b]Kraton GX 1702 SEP diblock
[c]Kraton GX 1701 SEP diblock

EXAMPLES 9-12

Further blends were prepared, as above, using 0.70 parts citric acid as the compatibilizer in compositions containing 49 parts polyphenylene ether, 41 parts nylon 6,6 and between 5 to 15 parts of the rubber component. These blends contained 0.30 parts Inrganox 1076 and 0.10 parts KI stabilizers. These citric based blends showed improvements using the SEP diblock in place of conventional triblock rubbers. In these blends the mode of failure was brittle.

TABLE 4

| EXAMPLE | RUBBER TYPE (Parts) | NOTCH IZOD | DYNATUP IMPACT |
|---|---|---|---|
| N* | Unsaturated SBS triblock (10)[a] | 2.8 | 420 |
| 9 | Saturated SEP diblock (5)[b] | 2.5 | 402 |
| 10 | Saturated SEP diblock (5)[b] | 2.5 | 402 |
| 11 | Saturated SEP diblock (10)[b] | 7.1 | 341 |
| 12 | Saturated SEP diblock (15)[b] | 10.5 | 342 |

*Comparison
[a]Kraton D 1102 triblock
[b]Kraton GX 1702 SEP diblock

EXAMPLES 13

It has also ben unexpectedly found that the saturated diblock rubbers utilized in the present invention provided excellent heat aging characteristics. This effect was not expected since previous work with saturated SEBS triblock rubber had shown no improvement in this regard. In these examples, 10 parts of the indicated rubber were used in polyphenylene ether-polyamide blends containing 49 parts PPE O and 41 parts polyamide (Nylon 6,6), compatibilized with 0.7 parts citric acid. The SBS triblock rubber was Kraton D 1102 and the SEP saturated diblock rubber was Kraton GX1702. These blends contained 0.1 arts KI, 0.3 part Irganox 1076 hindered phenol, and 4 parts $TiO_2$. Table 5 describes the results of this series of blends where mode of failure characteriations are given along with the Dynatup impact figures. In this series, B represents brittle failure, S represents a part which split upon impact indicating intermediate ductility.

TABLE 5

| Example | Rubber Type | Initial N. Izod | Dynatup Impact (initial) | 350° F. 2 hr | 350° F. 4 hr | 375° F. 2 hr | 325° F. 4 hr |
|---|---|---|---|---|---|---|---|
| O* | SBS Unsaturated Triblock | 2.8 | 420 S/B | 480S | 156S | 144S | 120B |
| 13 | SEB Saturated Diblock | 7.1 | 336S | 480S | 324S | 456S | 444S |

What is claimed is:

1. A thermoplastic composition comprising
   A. a base resin comprising a compatibilized polyphenylene ether resin and polyamide resin, and
   B. A ductile improving amount of a selectively hydrogenated diblock copolymer of the A-B type wherein block A is an alkenyl aromatic polymer and block B is an ethylene-propylene polymer.

2. A composition as in claim 1 wherein said compatible base resin is comprised of (a.) 5 to 95 weight percent polyphenylene ether resin and (b.) 95 to 5 weight percent polyamide resin, based upon the weight of a. and b. together.

3. A composition as in claim 2 wherein said polyamide resin constitutes a continuous phase in an amount greater than, approximately, 35 weight percent of the resinous components.

4. A composition as in claim 1 wherein said polyphenylene ether resin is a polymer or copolymer comprised primarily of one or more units selected from the group consisting of 2,6-dimethyl phenol units and 2,3,6-trimethyl phenol units, and wherein said resin has an intrinsic viscosity of 0.25 to 0.6 dl/g as measured in chloroform at 25° C.

5. A composition as in claim 4 wherein said polyphenylene ether is poly(2,6-dimethyl-1,4-phenylene ether).

6. A composition as in claim 1 wherein said polyamide resin is selected from the group consisting of polyamide 6, and polyamide 6,6.

7. A composition as in claim 1 wherein said diblock copolymer is comprised of, approximately, 20 to 40 weight percent styrene and 80 to 60 weight percent ethylene-propylene polymer based upon the weight of both blocks taken together.

8. A composition as in claim 1 wherein said diblock copolymer comprises, approximately, 1 to 30 parts by weight based upon 100 parts by weight of the base resin.

9. A composition as in claim 1 wherein said diblock copolymer comprises, approximately, 5 to 25 parts by weight based upon 100 parts by weight of the base resin.

* * * * *